No. 653,159. Patented July 3, 1900.
H. P. WELLMAN.
ELECTRIC HEADLIGHT LAMP.
(Application filed Dec. 14, 1899.)

(No Model.) 8 Sheets—Sheet 1.

Witnesses

Inventor
Attorney.

No. 653,159. Patented July 3, 1900.
H. P. WELLMAN.
ELECTRIC HEADLIGHT LAMP.
(Application filed Dec. 14, 1899.)

(No Model.) 8 Sheets—Sheet 3.

Witnesses Inventor

No. 653,159. Patented July 3, 1900.
H. P. WELLMAN.
ELECTRIC HEADLIGHT LAMP.
(Application filed Dec. 14, 1899.)
(No Model.) 8 Sheets—Sheet 4.

No. 653,159. Patented July 3, 1900.
H. P. WELLMAN.
ELECTRIC HEADLIGHT LAMP.
(Application filed Dec. 14. 1899.)

(No Model.) 8 Sheets—Sheet 6.

Witnesses
Inventor
Harlan P. Wellman,
Attorney

No. 653,159. Patented July 3, 1900.
H. P. WELLMAN.
ELECTRIC HEADLIGHT LAMP.
(Application filed Dec. 14, 1899.)
(No Model.) 8 Sheets—Sheet 7.

UNITED STATES PATENT OFFICE.

HARLAN P. WELLMAN, OF ASHLAND, KENTUCKY.

ELECTRIC HEADLIGHT-LAMP.

SPECIFICATION forming part of Letters Patent No. 653,159, dated July 3, 1900.

Application filed December 14, 1899. Serial No. 740,304. (No model.)

*To all whom it may concern:*

Be it known that I, HARLAN P. WELLMAN, of Ashland, in the county of Boyd and State of Kentucky, have invented certain new and useful Improvements in Electric Headlight-Lamps; and I do hereby declare the following to be a full, clear, and exact description of the invention, such as will enable others skilled in the art to which it appertains to make and use the same.

This invention contemplates certain new and useful improvements in electric headlight-lamps for electric vehicles, such as railway-cars and electromobiles.

The objects of the invention are, first, to provide improved means for preventing jarring or jolting of an electric vehicle from breaking or interrupting the arc and to avoid feeding the carbons together except upon the total interruption (either momentarily or permanently) of current through the lamp-circuit; second, to provide improved supporting means for the resistance-coils; third, to provide improved guides for the carbons in the arc-inclosure; fourth, to provide a simple and improved clamp for the carbon-carrying rods; fifth, to provide an improved bracket for the upper-carbon-carrying rod which will permit of the ready removal of the arc-inclosure and carbon-guides; sixth, to provide an improved terminal-casing which will permit of the ready removal of the lamp; seventh, to provide a headlight-lamp capable of being turned on axial bearings, but normally held parallel with the dash; eighth, to provide improved means for securing and inserting circuit-wires in the socket of the swiveled lamp, and, ninth, to improve the construction and general efficiency of a lamp of this character.

The invention will be hereinafter fully set forth, and particularly pointed out in the claims.

Figs. 6$^a$ and 6$^b$ show modifications of clutch. Fig. 17 is a front view of the lamp shown in Fig. 1.

Referring to the drawings, A designates the lamp-casing; $a$, a hollow plug on the bottom of the casing inclosing a bushing $a'$, of insulating material, formed with a central opening which is larger in its upper half, wherein is inserted a coil-spring $a^2$ and two metal contact-pieces $a^3$. A cap $a^4$, of insulated material, covers the upper end of the opening of the bushing and keeps the spring in place.

Figure 1:
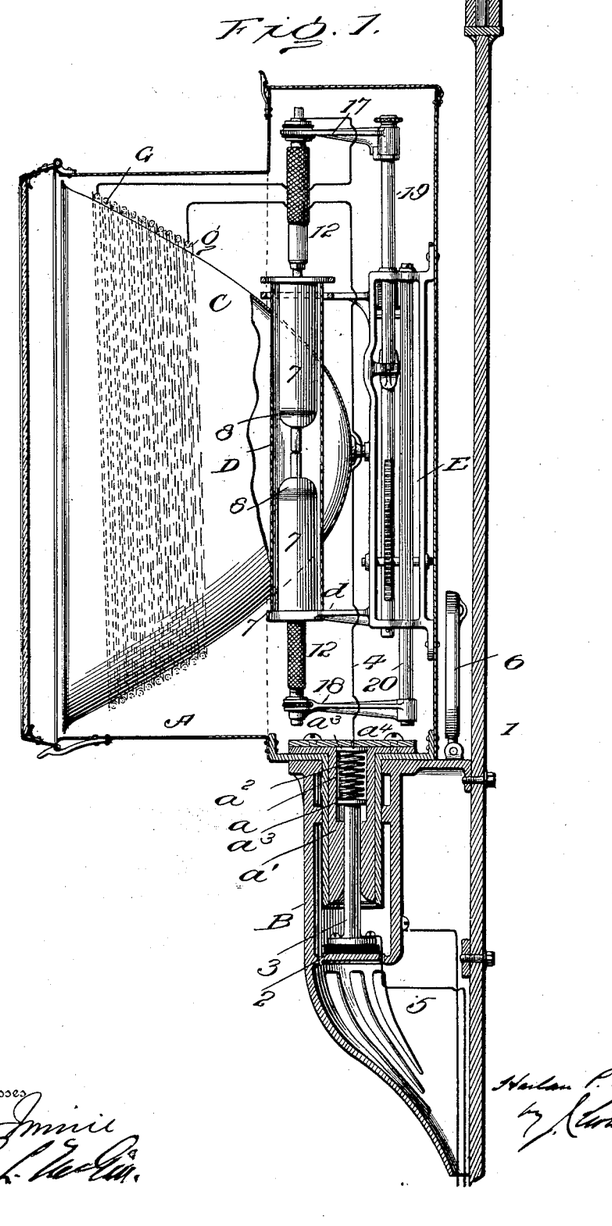
Figure 1 shows in side elevation and vertical section a lamp embodying my improvements.
Figure 2:
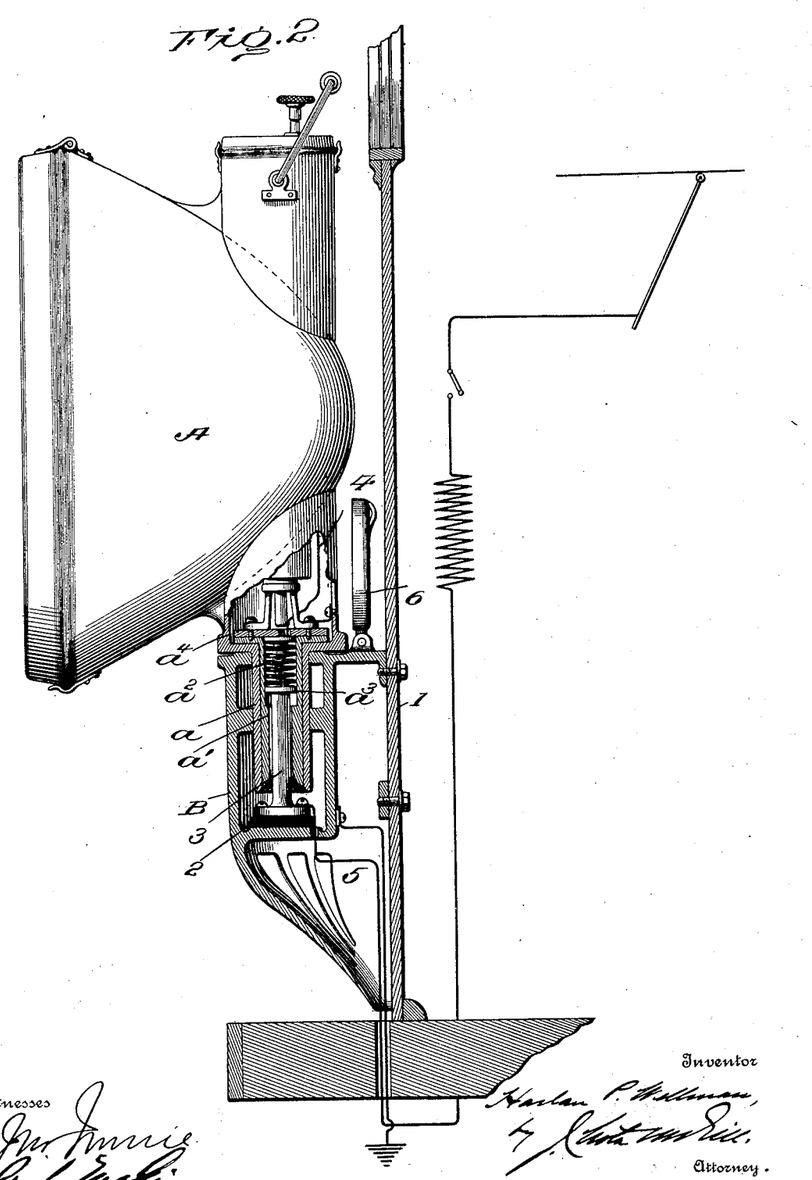
Fig. 2 is a view showing a slightly-modified form of lamp-casing with terminal casing on dash and lamp-contact in vertical section.
Figure 11:
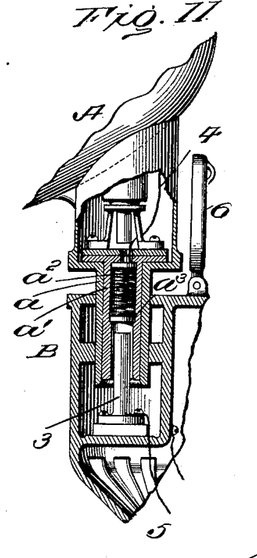
Fig. 11 is a vertical sectional view of the car-dash socket, showing the lamp partly raised.

B is the metal casing, bolted on the car-dash 1 and having a vertical chamber open at its top and closed at its bottom. On this bottom is a block 2, of insulated material, to which is secured an upright metal stud or terminal 3, which latter is of a diameter to permit it to fit into the opening in bushing $a'$. When the lamp is placed in its operative position, the spring and end contacts convey the live current to the positive carbon through wire 4, the stud being connected to the positive side of the circuit by wire 5. The negative carbon is grounded on the lamp-frame. Thus the current enters the dash-socket from its lower end through the terminal stud, spring and end contacts through the positive and negative carbons, and is grounded on the lamp-frame. If the lamp is raised out of the dash-socket before the current is cut off, the arc is first broken between the lower contact $a^3$ and stud-terminal 3 without causing injury to the lamp. A pivoted cover 6 closes the top opening of the metal casing B when the lamp is not in position. In Figs. 1 and 2 the lamp is shown in operative position, while in Fig. 11 the lamp is represented as being partly raised out of the casing B with the circuit broken.

Figures 12, 13, 14:
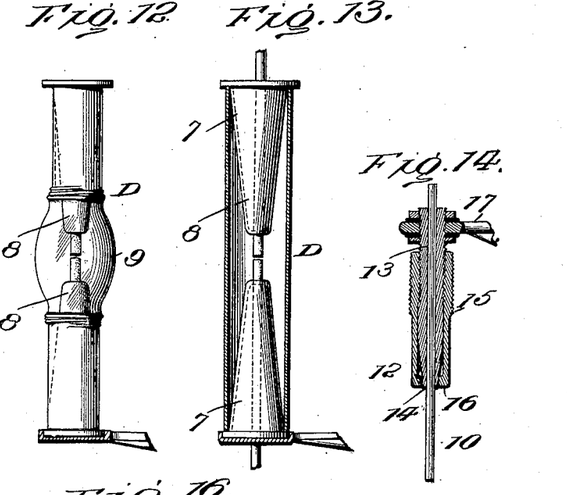
Fig. 12 is a view of the arc-inclosure shown in Fig. 10.
Fig. 13 is a view of a slightly-modified form of arc-inclosure.
Fig. 14 is a sectional view of the carbon-clamp.
Figures 15, 16:
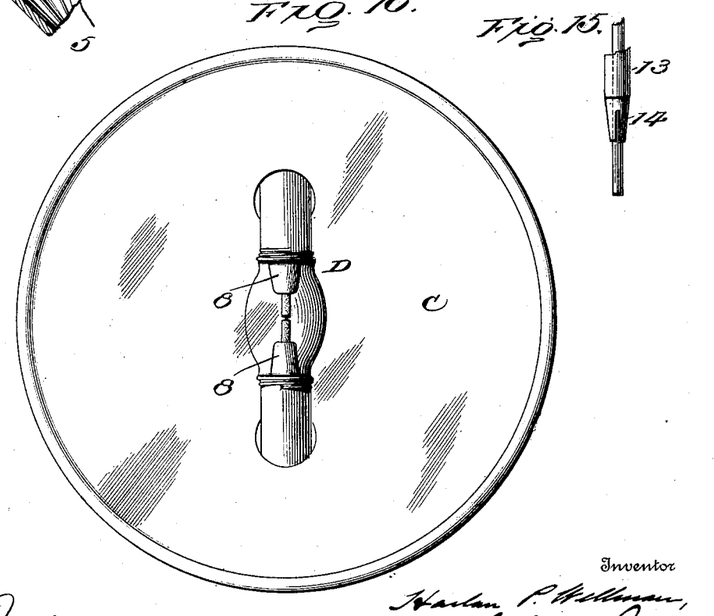
Fig. 15 is a slightly-enlarged view of a portion of such clamp.
Fig. 16 is a face view of the reflector with arc-inclosure in position.

C is the parabolic reflector, and D the arc-inclosure, passed through openings near the vertex of the former. At its lower end the arc-inclosure is supported by a bracket $d$, extending from the frame E of the carbon-feeding mechanism. Within the arc-inclosure are caps 7, having beveled portions 8 of a size to permit of their projection to points near the focal center, the outer ends of the caps being flanged to fit against the ends of the inclosure. These caps have openings at their inner ends to accommodate the carbons. They are preferably of metal coated with a heat-resisting enamel, preferably of white substance, which will assist in reflecting the light outward and alleviate to some extent the shadows caused within the reflector. This enamel also prevents too large a portion of the metallic caps being exposed to the effects of the combustion of the arc, which would have a tendency to form a milky or obstructive coating on the inner side of the arc-inclosure. These caps are extended sufficiently far within the inclosure to form guides for the carbons and prevent lateral movement thereof. In Figs. 12 and 13 these caps are shown slightly different from those in Fig. 1, and likewise the arc-inclosure in Fig. 12 has only its center 9 of translucent material.

The carbons 10 are held by clamps 12. (Shown in Figs. 1, 10, 14, and 15.) Each clamp is composed of a central tubular portion 13, exteriorly threaded and tapered and split at its lower end 14. A sleeve 15, milled on its outside, works on the thread of the tubular portion 13 and is formed with an inwardly-extending flange 16, designed to engage the tapered end 14, whereby said end will by the turning of the sleeve clamp or release the carbon. These carbon-clamps are supported by brackets 17 and 18, secured, respectively, to the rods 19 and 20 of the carbon-feeding mechanism. To permit of the removal of the arc-inclosure and guiding-caps from the reflector for the purpose of cleaning or renewing the parts, I movably secure the bracket 17 to the rod 19. This bracket has an opening for said rod beveled at top and bottom, and it rests upon a collar $20^\times$, held by a screw 21 to the feed-rod, said collar having a tapered surface corresponding to that of the bracket. Against the upper tapered surface of the bracket-opening fits a washer 22, correspondingly tapered, which is caused to bind against the bracket and hold the latter firm by means of a screw 23 working within rod 19 and having a projecting milled head. Two lugs 24 on the collar $20^\times$ limit the axial movement of the bracket. A spiral spring 25, fitted within a central recess within the bracket, serves to always hold the bracket in its proper operative position even if the clamp should become loose. To remove the arc-inclosure, the feed-rod 19 is lifted to the proper position and screw 23 is loosened, relieving washer 22 and permitting the bracket to be moved around, so as not to interfere with the removal of the parts of the inclosure, which can be readily raised from its supporting-bracket $d$.

Figure 3:
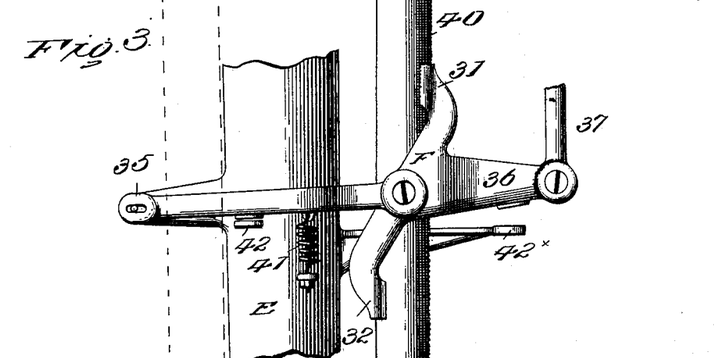
Figs. 3 and 4 are views of the clutch for the carbon-feeding mechanism.
Figure 4:
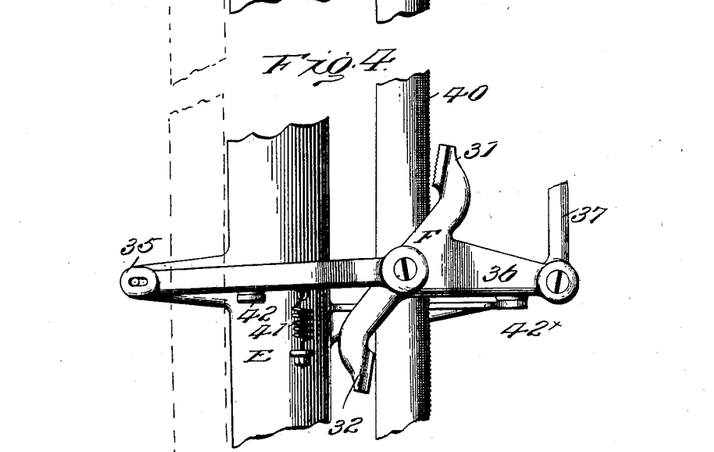
Figure 5:
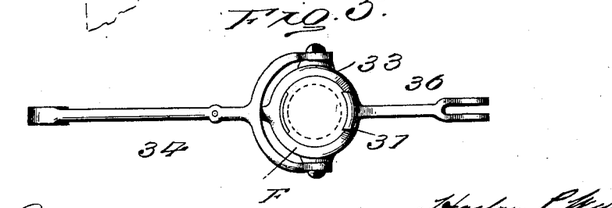
Fig. 5 is a plan view of the clutch and its supporting-lever.
Figures 6, 7, 8, 9, 10:
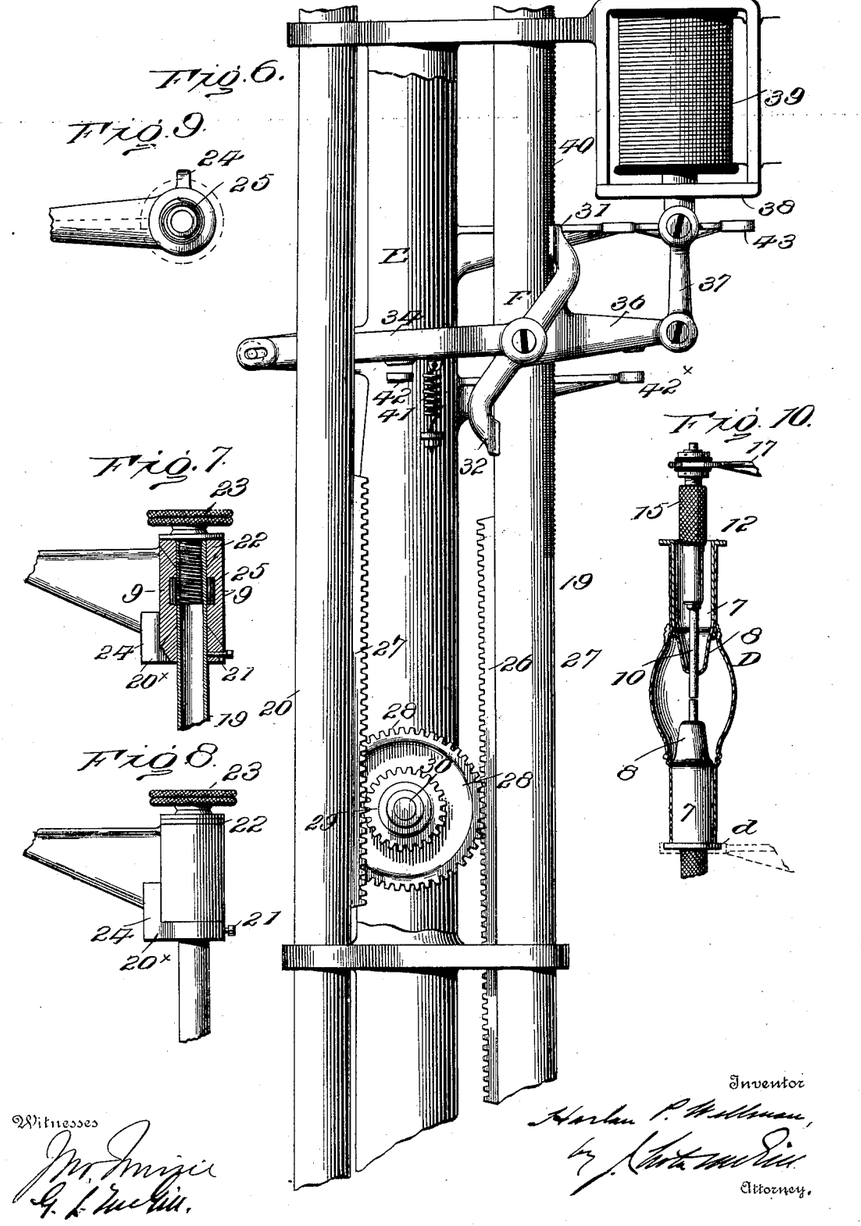
Fig. 6 is a view of the carbon-feeding rods and rack-bars with clutch.
Fig. 7 is a vertical sectional view through the upper end of one of the carbon-feeding rods and the bracket thereof.
Fig. 8 is an outside view thereof.
Fig. 9 is a horizontal sectional view on line 9 9, Fig. 7.
Fig. 10 is a vertical sectional view through the arc-inclosure, showing one of the guiding-caps in side elevation, the other being in section.
Figure 6A:
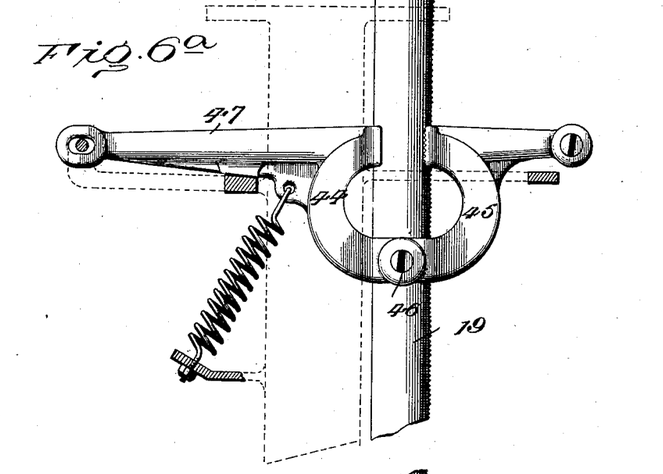
Figure 6B:
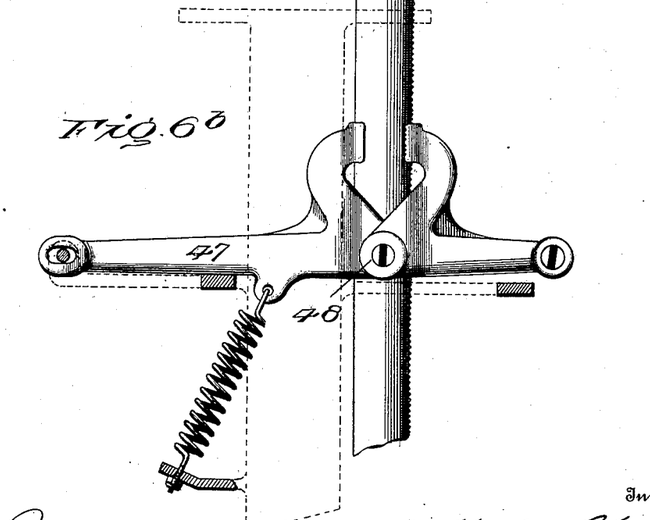

The adjusting-rods 19 and 20 of the positive and negative carbons, respectively, are provided with well-known gravity feed mechanism, comprising rack-bars 26 and 27, which mesh, respectively, with large and small gear-wheels 28 and 29 on a common shaft 30, the rotation of which will effect the movement of the carbons toward or away from each other, such movements being by reason of the difference in diameter between the wheels 28 and 29 and the greater leverage exerted by the former commensurate with the relative consumption of the positive and negative carbons. The carbons are not fed together except when the current is entirely cut off or interrupted in the lamp-circuit. This is controlled by a clutch F, having upper and lower jaws 31 and 32, between which the carbon-adjusting rod 19 is passed. These jaws extend in opposite directions from a central circular portion 33, which is pivoted on the forked end of an arm 34, fulcrumed at 35 on frame E. The clutch has a forwardly-extending arm 36, which is connected by a link 37 to the armature 38 of a solenoid-magnet 39, the coils of which are within the lamp-circuit. The upper jaw 31 (or it may be the lower jaw) of the clutch is serrated on its inner face to engage a correspondingly-serrated surface 40, longitudinal of the rod 19. A spring 41, secured to arm 34 and frame E, serves to normally hold the clutch out of engagement with the adjusting-rod, the downward movement of the clutch being limited by stops 42 and $42^\times$. A stop 43, extending from frame E, limits the downward movement of the armature 38. When the current is supplied to the lamp, the armature of the solenoid-electromagnet is attracted, and through its connection with the arm 36 of the clutch the latter is turned on its fulcrum on arm 34 and raised from stop $42^\times$, the axial movement of the clutch being limited upon its jaws engaging with the rod 19. The upward movement of the armature not yet being complete, the clutch and feeding-rod 19 are then elevated, the pivoted arm 34 being lifted from off its stop 42 as against the tension of spring 41. This upward movement continues until the armature is set against the magnetic poles, when the normal length of the arc is formed. The various parts of the lamp mechanism remain in this same relative position until the current is momentarily or permanently interrupted in the lamp-circuit. When this occurs, the clutch and its supporting-arm may drop to their seats under the tension of spring 41, relieving all pressure on the adjusting-rod and permitting the carbons to be fed together again by gravity in the exact proportion of their consumption. Upon restoration of current to the lamp the same operations are repeated in forming the arc, which will continue to burn until the current is again totally interrupted. The various positions of the clutch are illustrated in Figs. 3, 4, and 6. The clutch proper is shown as encircling the rack feed-rod; but this is not absolutely essential, as it may extend over only one side of the rod and have its top and bottom jaws projecting laterally, so as to be brought into engagement with opposite longitudinal sides of the adjusting-rod. By serrating one of the jaws of the clutch and the adjacent edge of the adjusting-rod slipping of the parts is prevented. In Fig. 6$^a$ the clutch is shown as composed of two jaws 44 and 45, hinged together at 46, the jaw 44 forming part of the pivoted arm 47. In this form engagement of the jaws with the serrated rod is in line with the pivoted arm 47 and directly opposite to each other, the point of union between the jaws being dropped below the arm 47. In Fig. 6$^b$ the jaws are hinged together at 48 in direct line with arm 47, and their gripping ends are both extended above such arm. Modifications of the clutch may be made, but in all forms the jaws contact with opposite sides of one of the carbon-adjusting rods, and a firm grip is insured by the engaging serrated surfaces.

The resistance-coil G is located on the exterior of the reflector, with the result that it is out of the way and consumes but little space, as pointed out in my application for patent filed November 4, 1899, Serial No. 736,957. The means for supporting the coil in the present instance differs from that specified in the above-noted application. A spirally-wound grooved or ridged strip $g$ is located on the outer surface of the reflector. The exposed surface of this strip is covered with a heavy layer of heat-resisting enamel. The resistance-coils G are wound in this enamel-coated grooved strip, thus preventing the heat from the coils from having any injurious effect upon the inside silvered surface of the reflector. Terminal connections, insulated and secured to the outside of the reflector, serve as ready means for connecting the resistance to the lamp-circuit.

Figures 18, 19, 20, 21, 22, 23:
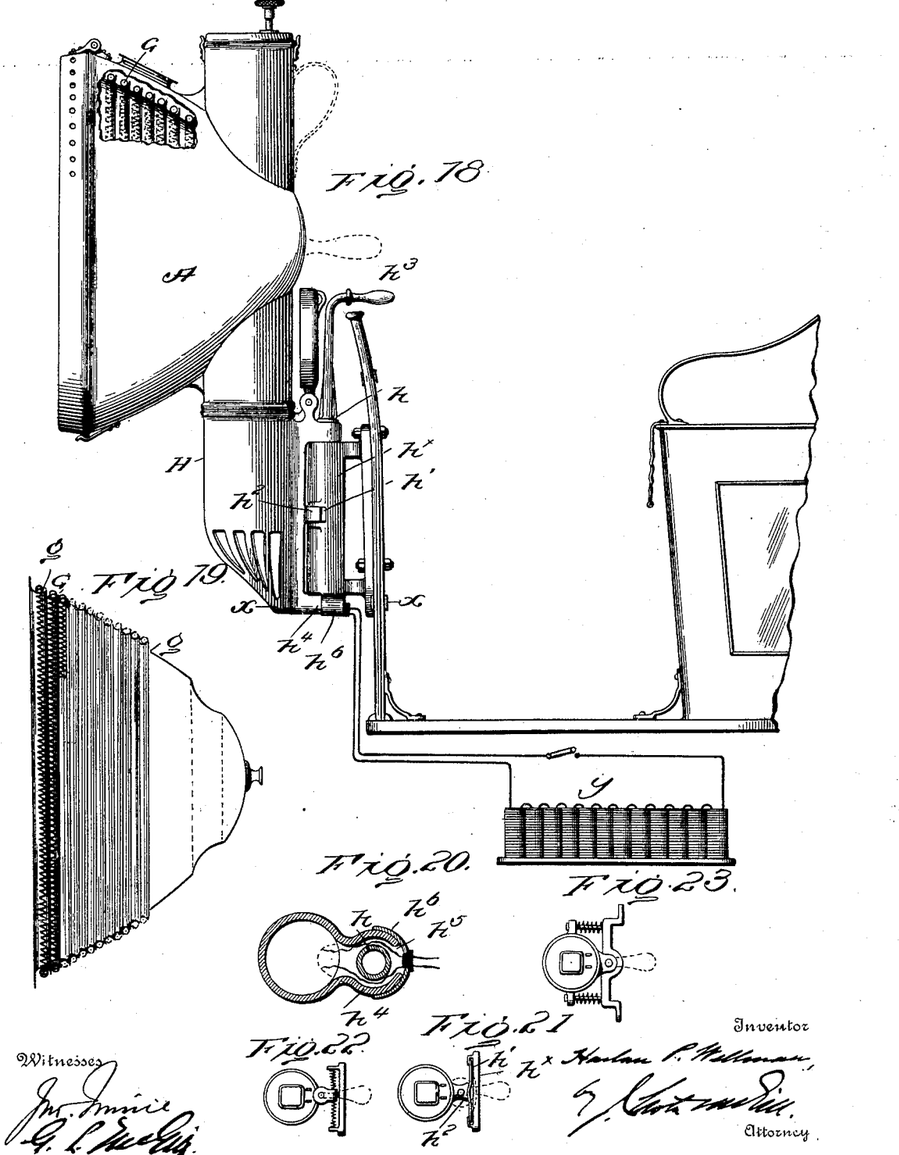
Fig. 18 shows my improved lamp as applied to the dash of an electromobile.
Fig. 19 is a view of the reflector detached.
Fig. 20 is a horizontal sectional view on line $x\ x$, Fig. 18.
Fig. 21 shows the spring indicated in Fig. 18 for holding the lamp in its normal position.
Figs. 22 and 23 illustrate modifications thereof.

In electric vehicles, especially electromobiles, it is frequently necessary to throw the light of the lamp other than in a direct line in front of the vehicle. In Fig. 18 I have shown the terminal casing H, on which the lamp is mounted, as being swiveled on a vertical rod $h$ of a bracket $h^\times$, secured to the dash of the vehicle. The casing H, and consequently the lamp, is held in the normal position, with the face of the lamp parallel with the dash, by means of a spring $h'$ within bracket $h^\times$ engaging the lug $h^2$ of casing H. By means of a handle $h^3$ the swiveled casing and lamp may be manipulated as desired, enabling the light to be thrown to the right or left. When the hand is released from the handle, the lamp and the terminal casing are immediately returned to their normal position by the spring $h'$. Other forms of spring may be employed, as shown in Figs. 22 and 23, for retaining the lamp in its normal position parallel with the dash. I prefer, however, the form shown in Figs. 18 and 21.

In order to connect the circuit-wires to the swiveled casing, the latter, at its lower end, has a rearwardly-projecting circular portion $h^4$ concentric with the pivot-rod $h$ and having an opening $h^5$. This portion $h^4$ of the casing is inclosed in part by a curved boxing $h^6$ of the bracket $h^\times$. The circuit-wires enter through the rear of boxing $h^6$ and are carried into the circular portion $h^4$, the flexibility of the wires permitting of the casing H and the lamp being turned either way without breaking the wires. The current for the headlight-lamp in Fig. 18 is represented as being supplied by the same storage battery $y$ by which the vehicle is propelled.

Various changes may be made in the construction of my lamp without departing from the scope of the invention. The operation of the lamp is apparent from the description herein contained.

I claim as my invention—

1. In an electric headlight-lamp, a reflector having a spiral groove on its exterior, and a resistance-coil within such groove, as set forth.

2. In an electric headlight-lamp, a reflector having a spiral groove on its exterior, a heat-resistance enamel covering in such groove, and a resistance-coil also within the groove, as set forth.

3. In an electric headlight-lamp, a reflector having a groove or ridged strip encircling its exterior, an insulating, heat-resisting covering for such strip, and a resistance-coil held by said strip, as set forth.

4. In an electric lamp, an arc-inclosure, caps extending inwardly therein to near the arc-forming point having central openings for the carbons, said caps engaging at their outer ends the ends of the inclosure, and a heat-resisting coating for such caps, as set forth.

5. In an electric lamp, an arc-inclosure, caps extending inwardly therein to near the arc-forming point having central openings for the carbons, said caps at their outer ends having flanges engaging the ends of the inclosure and a heat-resisting enameled coating for such caps, as set forth.

6. The combination, in an electric lamp having carbon-feeding rods, of a bracket, for one of the carbons, journaled at one end on one of said rods, and a spring tending to hold said bracket in its normal position, substantially as set forth.

7. The combination in an electric lamp having carbon-feeding rods, of a bracket, for one of the carbons, journaled at one end on one of said rods, stops to limit the axial movements of said bracket, a spring tending to hold the latter in its normal position, and means for locking the bracket to its rod, substantially as set forth.

8. The combination, in an electric lamp having carbon-feeding rods, of a bracket, for one of the carbons, journaled at one end on one of said rods and having an opening, for such rod, tapered at its ends, a collar on such rod having a tapered surface, a washer also having a tapered surface, said washer and collar conforming to the tapers of the bracket, and a screw for binding the latter, substantially as set forth.

9. The combination, in an electric lamp having carbon-feeding rods, of a bracket, for one of the carbons, journaled at one end on one of said rods and having an opening for the latter tapered at its top and bottom, a collar and washer on said rod fitting against the tapered ends of said opening, a screw for binding said parts, and a spring within the bracket for holding it in its normal position in relation to the rod, substantially as set forth.

10. In an electric lamp having positive and negative carbons, and mechanism for feeding such carbons together comprising vertically-movable rods, one of said rods being serrated longitudinally, a clutch having jaws paralleling opposite sides of the latter rod and having serrated faces for engaging the serrated portion of the latter, an electromagnet within the lamp-circuit, an armature, a connection between the latter and the clutch, and a spring tending to hold the clutch out of engagement, as set forth.

11. In an electric lamp having positive and negative carbons, and mechanism for feeding such carbons together, comprising vertically-movable rods, one of which has a serrated surface, a clutch having jaws paralleling and designed to engage opposite sides of such rod and contacting with the serrated surface, a support for said clutch pivoted at one end, an electromagnet, within the lamp-circuit, having an armature to which said clutch is connected, and a spring acting on said support tending to hold the clutch disengaged, as set forth.

12. In an electric lamp having positive and negative carbons, and mechanism for feeding such carbons together, comprising vertically-movable rods, one of which has a serrated surface, a clutch having jaws for engaging opposite sides of such rod and contacting with the serrated surface, a pivoted arm on which said clutch is pivotally mounted, a spring tending to hold said clutch out of engagement with the rod, and an electromagnet, within the lamp-circuit, having an armature to which the clutch is connected, substantially as set forth.

13. In an electric lamp having positive and negative carbons, and mechanism for feeding such carbons together, comprising vertically-movable rods, one of which has a serrated surface, an arm pivoted at one end, a clutch, pivoted on said arm and having a serrated jaw for engaging with the serrated portion of said rod, and also having an outwardly-projecting arm, an electromagnet, within the lamp-circuit, having an armature, a link connecting said armature to the clutch-arm, stops for limiting the downward movements of the pivoted arm and the clutch, and a spring tending to hold the clutch out of engagement, substantially as set forth.

14. The combination with an electric vehicle, of a bracket mounted on the dash thereof, a casing swiveled on said bracket, and having a vertical opening and a contact-terminal in the latter, a stud projecting from said casing, a spring engaging said stud for holding the casing in its normal position, a lamp mounted on the casing and having contacts designed to be located in said vertical opening for engaging said terminal, and a handle for turning the casing and lamp to the right or left, substantially as set forth.

15. The combination with an electric vehicle, of a bracket mounted on the dash of such vehicle having a depending rounded portion formed with an opening for the passage of the current-wires, a casing pivotally mounted on said bracket and having a rounded portion fitted in said former rounded portion and an opening to accommodate said wires, a handle secured to the casing for effecting the turning thereof, and a lamp mounted on the casing, substantially as set forth.

16. The combination with a casing having an insulated terminal stud and a central opening into which the stud projects, of the lamp having a hollow plug, a bushing therein formed with a central opening to receive said stud, a spring, and two end contact-pieces, said spring and contact-pieces being within said bushing, and an electrical connection between said spring and end contact-pieces in the lamp-circuit, substantially as set forth.

17. The combination with a casing having an insulated terminal stud and a central opening into which the stud projects, of the lamp having a hollow plug, a bushing therein formed with a central opening to receive said stud, a spring and two end contact-pieces also within said opening, a cap over said opening, a wire leading from said cap and connected to the lamp-circuit, and a pivoted cover for closing over said casing when the lamp is removed, substantially as set forth.

In testimony whereof I have signed this specification in the presence of two subscribing witnesses.

HARLAN P. WELLMAN.

Witnesses:
W. C. RICHARDSON,
R. L. RICHARDSON.